Oct. 10, 1950            S. WISE            2,525,162

BAYONET CLOSURE AND ADAPTER THEREFOR

Filed Oct. 2, 1945

INVENTOR.
Solomon Wise
BY Harry P. Canfield
ATTORNEY

Patented Oct. 10, 1950

2,525,162

UNITED STATES PATENT OFFICE 2,525,162

BAYONET CLOSURE AND ADAPTER THEREFOR

Solomon Wise, Shaker Heights, Ohio

Original application May 9, 1941, Serial No. 392,673. Divided and this application October 2, 1945, Serial No. 619,809

2 Claims. (Cl. 220—40)

This invention relates to filling caps or closures for gasoline or like liquid fuel tanks, such for example as those provided on automotive vehicles.

As is well-known, the liquid fuel tank of an automotive vehicle is filled through a tube or stem, which is thereafter closed by a detachable gasket-sealed cap to keep out dust, dirt, water and other foreign material and to prevent evaporation of the fuel.

The standard commercial vehicle tank filling stem is tubular and is provided at its open end with internal cam surfaces. The standard cap has a central portion which enters the open end of the stem and has lugs which upon rotation of the cap, engage the cam surfaces to draw the cap tightly upon the end of the stem. An annular sealing gasket is provided at the engagement, between the cap and stem-end.

The cam engaging lugs of the cap are usually made resilient or yieldable so that the cap continues to get tighter and seal the gasket tighter as the cap is turned.

In order for the gasket to properly engage the end of the stem, the gasket is mounted in the cap; and the central portion of the cap which enters the stem end is formed so as to be guided or centered therein so that the gasket is centered or positioned to be coaxial with the end of the stem.

Filling tubes of commercial vehicle tanks have been standardized in different sizes, in general two sizes of different diameters. A cap which will center in a large diameter stem, is too large to be used with a small diameter stem. A cap which will center in a small stem will not center in a large one.

In order to keep down the cost of such caps, they must be made in quantities; but because of there being two sizes the manufacturer must make up and assemble two different sets of parts for the two sizes of caps, and stock two sizes of complete caps; so that the economies resulting from quantity production are less than they would be if the caps were all alike.

It is this situation which has led to the present invention. By the practice of the invention a quantity of cap parts and assembled caps can be made up, all exactly alike for either size, and complete except for the gasket. A quantity of small and large gaskets, and a quantity of simple, cheap adapters (to be described) are also provided. At the time of filling an order for a quantity of caps of small size, the manufacturer takes a quantity of caps out of stock and ships them with small gaskets. To fill an order for a quantity of large caps, the manufacturer takes a quantity of caps out of the same stock, assembles adapters with them and ships them with large gaskets.

Thus all of the caps, at the time of making and assembling them, are exactly alike for both sizes and the quantity which can be made at one time is correspondingly increased and the cost correspondingly reduced.

In order to effect this result, and as a part of the invention, a single size of resilient cam engaging lugs must be provided on the cap, and made so as to cooperate with and perform their function with the cam surfaces on the two sizes of stem; and since the stems are standardized to have two diametrically opposite cam surfaces, such resilient lugs must, in any case, engage them equally or with equalized resilience, in order that all points around the annular gasket will be engaged with equalized sealing force between the cap and the stem end. The invention therefore comprises also a single size and construction of spring lugs to accomplish these results in an improved manner and with both sizes of cap.

The invention is applicable to many constructions of cap; but it has particular advantages of economy as described, when the cap is of the key-operated, lock-type; because of the greater cost of making and assembling that type of cap.

The primary objects of the invention are set forth in the foregoing.

Other objects will be apparent to those skilled in the art to which the invention appertains.

The invention is fully described in the following description taken in connection with the accompanying drawing, in which.

The subject matter of this patent is divisional from my Patent 2,391,498 issued December 25, 1945, the application for which was filed May 9, 1941, and copending herewith.

Figure 2:
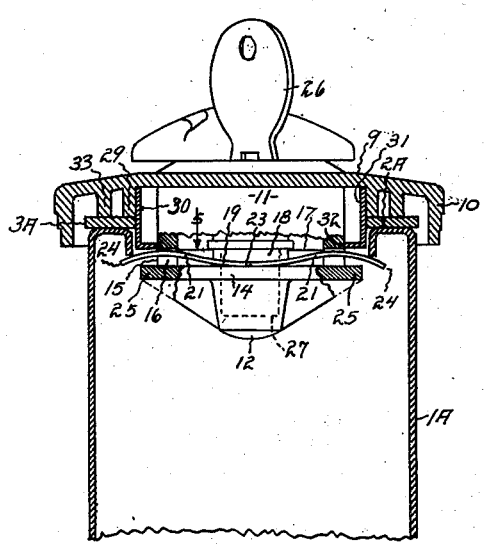
Fig. 2 is a view similar to Fig. 1 showing the cap of Fig. 1 with an adapter, embodying part of the invention, assembled therewith, and with the cap mounted on a stem of large size.
Figure 1:
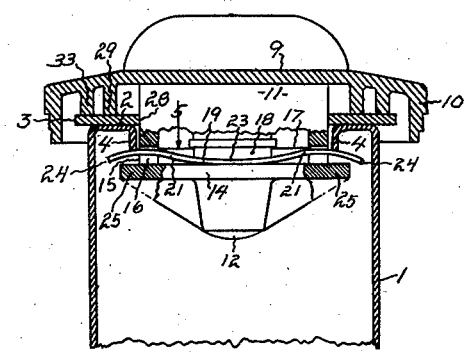
Fig. 1 is a longitudinal sectional view, showing a filling cap embodying a part of the invention and mounted on a filling tube or stem of small size.
Figure 3:
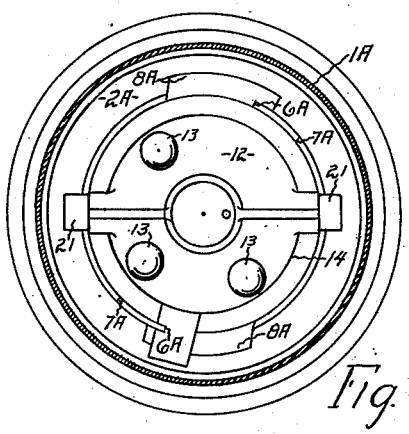
Fig. 3 is a bottom plan view of the parts of Fig 2.
Figure 4:
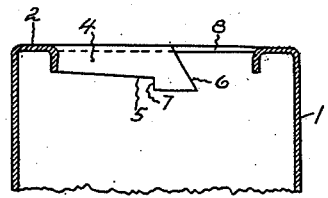
Fig. 4 is a fragmentary longitudinal sectional view of the end portion of a filling stem, the sectional plan of the view being approximately at right angles to that of Fig. 1.
Figure 5:
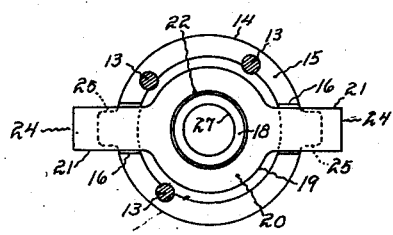
Fig. 5 is a top plan view of two of the parts which are viewed from the side in Fig. 2 and from the bottom in Fig. 3; the view being taken from a plane of juncture of parts indicated at 5 in Fig. 2, or in Fig. 1.

Referring to the drawing, I have shown at 1 in Figs. 1 and 4 and at 1A in Figs. 2 and 3, the filling tube or stem of a fuel tank which customarily extends upwardly from the tank as illustrated, the tank being not shown; and the stem 1 representing a small size or small diameter stem and the stem 1A representing a large size as referred to hereinbefore.

The upper end of the stem 1 is turned over to provide a generally annular surface 2 engageable by a sealing gasket 3; and the metal is then bent inwardly or axially to provide a diametrically opposite pair of flanges 4—4, the inner edges of which are inclined to be cam-shaped as at 5 in Fig. 4, each of the flanges terminating circumferentially in a shoulder 6 as shown for one of them in Fig. 4 and the inclined cam surface 5 terminating in a shoulder 7.

The large stem 1A has a similar gasket sealing surface 2A but of larger diameter, and similar flanges 4A—4A, and shoulders 6A and 7A. The surface 2A as shown in Fig. 3 has openings 8A therein, diametrically opposite; and it will be understood that the sealing surface 2 in the forms of Figs. 1 and 4 has like openings, one of which is indicated at 8.

The stem thus described is the conventional form of stem customarily provided on fuel tanks of automotive vehicles.

The cap comprises a cover portion or body 9 having a depending peripheral flange 10, these parts being larger in diameter than the stem 1 or 1A and being externally of ornamental appearance. On the underside of the body 9 is an extension 11 preferably cylindrical, and in the form shown of tubular or housing form, the lower end portion being broken away to further illustrate its tubular character. On the lower end of the extension or housing 11 is mounted a housing cover 12 by means of a plurality of screws 13—13. The housing cover 12 comprises generally a circular plate 14 having an annular head or rim 15 extending upwardly therefrom, provided with a pair of diametrically opposite notches 16 in the rim, the upper edge of the rim engaging the lower edge of the tubular housing at the juncture plane 17, see Figs. 1 and 2, the screws 13 passing through suitable perforations in the plate 14 and being threaded into the end of the housing 11.

On the upper side of the plate 14 and approximately at its center and coaxial with the housing 11 is an upwardly projecting post or protuberance 18, the outer surface of which is preferably cylindrical. At 19 is a sheet metal spring consisting generally of a central portion 20 of annular form and arms 21—21 extending radially away therefrom in opposite directions. A central perforation 22 in the spring loosely surrounds the said post 18; and the arms 21—21 extend laterally through the notches 16 of the cover; which notches, when the cover is in place on the housing 11 are covered by the latter and as illustrated constitute openings through and out of which the arms extend.

Figure 6:
Fig. 6 is a longitudinal sectional view showing in modified form a spring element of the other figures.
Figure 7:
Fig. 7 is an end view of the spring of Fig. 6.

Viewed from the side as in Figs. 1 and 2, see also Fig. 6, the middle of the spring bulges downwardly convexly as at 23 and rests upon the top side of the plate 14, the latter thereby serving as a spring support. Proceeding radially from the center the spring bends upwardly into the arms 21—21, and as they pass through the openings 16, they are convex upwardly, and where they extend beyond the openings, they bend downwardly again, terminating in finger ends 24—24.

The spring 19 is not fastened rigidly at any point to the structure. The perforation 22 encircling the post 18 loosely, prevents the spring from shifting radially in any direction; the arms 21—21 by projecting through the openings 16, prevent the spring from rotating relative to the rest of the structure; and by the engagement of the arms with the upper walls of the opening 16, which wall is provided as described by the lower end of the housing 11, the spring is trapped against movement axially.

The side walls and top walls of the openings 16—16 may therefore be considered as spring arm engaging abutments for the purposes referred to.

By this construction, it is important to note that the spring by means of its downwardly convex central bulge 23 may rock freely on the spring support 14; and that the spring has no rivet holes or the like therein, as are sometimes provided in sheet metal springs to mount them, and which cause the bending of the spring to concentrate at such holes and prematurely crystallize and break thereat.

Directly under the fingers 21, the spring support 14 has wings 25—25 extending radially therefrom. Normally the fingers 21 of the spring are spaced from the wings 25—25.

Preferably, before the spring is assembled in the device, it has the side view contour shown in Fig. 6 in solid line. When it is placed in position and the cover 12 is fastened on the housing 11, the spring is thereby flattened out somewhat, as shown in broken lines in Fig. 6, and in solid line in Figs. 1 and 2; and thereby is given initial tension or set or load for well known reasons and purposes.

The said cylindrical post or protuberance 18 may be provided on the upper side of the cover 12 for the sole purpose of anchoring the spring at its center with freedom to rock on the spring support 14 as described. The cap shown in the drawing to illustrate the present invention, however, is one which can be locked on the filling stem by means of a key 26 and lock elements not shown and which lock parts constitute no part of the present invention, the same being fully illustrated and described in the aforesaid Patent No. 2,391,498. When such lock parts are employed, this protuberance or post 18 has a pocket 27 shown in dotted line extending downwardly thereinto and containing some of the lock parts.

Referring to Fig. 1, the annular gasket 3 has its central perforation 28 of such size as to snugly fit the cylindrical housing or extension 11, so that when it is telescoped thereover, it will adhere thereto; and the upper side of the gasket engages against an annular wall 29 of the cap body, which is of approximately the same diameter as the sealing surface 2.

To mount the cap, as thus far described, upon the stem 1, it is first rotated by hand until the wings 25 and spring fingers 21 come opposite the openings 8 in the flange 2, and then these parts are projected down through the openings until the gasket 3 rests upon the flange 2. The cap is then rotated, and the spring fingers 21 engage the cam edges 5; and upon continued rotation of the cap the fingers or the spring arms 21—21 bend downwardly as will be understood, and resiliently draw the cap downwardly, tightly engaging the gasket 3 between the face 2 and the annular wall 29 to seal the end of the stem. The wings 25—25 projecting under the spring fingers protect the spring arms from being bent too far, due to irregularities of the stem parts. The thrust of the spring is at the center of the cap by virtue of the said bulge 23 of the spring. If either of the stem cam edges 5 due to irregularities of the stem parts, should propel its corresponding end of the spring farther than the other, the spring will rock on the bulge to cause both ends of the spring to exert equal and balanced thrusts. The gasket 3 is thus in every case pressed upon the face 2 with equalized sealing pressure all the way around the same.

When the cap was inserted in the end of the stem 1, it will be observed that the cylindrical housing or extension 11 fits, with suitable clearance, the opening at the end of the stem, and the cap is thereby centered on the end of the stem, to center the gasket and the annular wall 29 coaxially thereof for the described sealing purposes.

The same set of cap parts as described to fit the small filling stem of Fig. 1 are used to fit the large filling stem of Figs. 2 and 3; but in the case of the large stem an adapter 30 is added to the structure. The adapter 30 is in the form of a sheet metal cup, the side wall 31 of which, at the open end of the cup, is frictionally, telescopingly fitted into and within the said annular wall 29 whereby it is attached thereto, and becomes a part of the assembly together with the body wall 9 and side wall 10 of the cap. The bottom of the cup has a large perforation 32 of such size as to fit loosely, with suitable clearance, the depending housing or extension 11 to improve the appearance. The gasket, in this case 3A, may for convenience and economy of manufacture, be of the same outside diameter as the gasket 3, Fig. 1, and its central perforation snugly fits the cup side wall 31 and adheres thereto as a part of the assembly. The side wall 31 of the adapter extends below the gasket 3A, and when the cap is presented to the end of the stem 1A, the wall 31 of the adapter functions to center the cap on the stem 1A, of Fig. 2, in the same manner as the extension 11 functions to center it on the stem 1 of Fig. 1. The cap body 9 is provided with a second annular wall 33 upon which the gasket 3A engages, and it is of such diameter as to be opposite the large diameter sealing surface 2A of the stem 1A. If preferred these two annular walls may be merged into a single wall, but since the cap body is preferably die-cast, economy of die casting metal is effected by making them as separated walls as shown.

The cap is mounted in the stem 1A as described for the stem 1 of Fig. 1 and when rotated draws the cap inwardly and clamps the gasket 3A between the surface 2A and the annular wall 33 with equalized sealing pressure.

Having in mind the underlying principles hereinbefore set forth, it will now be apparent that whether the cap is provided with a lock or not, the parts of the cap can all be made and assembled as in Fig. 1 and stocked, whether they are to be sold for use with a large stem or a small one. If the cap is to be used with a small stem, it is made ready to ship by providing a gasket 3 telescoped over the central housing 11. If the cap is to be used with a large stem it is made ready to ship by first telescoping into place the adapter 30 and putting on the gasket 3A.

The spring as described may, if desired, be provided with the additional modification shown in Fig. 6, wherein as shown the metal at the extreme ends or fingers of the spring, besides being upwardly convex as at 34 and as described for Figs. 1 and 2, are transversely upwardly convex as at 35. This adds greater stiffness to the extreme ends of the spring making them more resistant to bending and causes the actual resilient yielding of the spring to occur farther inward along the spring arms 21—21 thus tending to distribute the bending over a greater length of the spring.

I claim:

1. A cap closure for the tubular filling stems of fuel tanks comprising: a cap body; a generally cylindrical extension on the underside of the body; transversely extending latching means on the end of the extension for cooperation with standard latching means in either a large size or a small size stem upon rotation of the body; wall portions on the underside of the body radially spaced from the extension and circumscribing the extension, and extending parallel with the axis of the extension; a tubular element frictionally engaged with the wall portions and thereby detachably mounted on the wall portions and projecting below the wall portions and disposed by the wall portions to be substantially coaxial with the extension, and sized diametrically to enter a filling stem of large size and center the extension therein; the extension being sized diametrically to enter a filling stem of small size and be centered therein when the tubular element has been detached.

2. A cap closure for the tubular filling stems of fuel tanks comprising: a cap body; the body comprising a generally cylindrical extension on its underside; transversely extending latching means on the end of the extension for cooperation with standard latching means in either a large size or a small size stem upon rotation of the body; a tubular element disposed substantially coaxially of the extension and surrounding the extension and frictionally engaged with corresponding portions provided on the body to detachably mount it thereon and sized diametrically to enter a filling stem of large size and center the extension therein; the extension being sized diametrically to enter a filling stem of small size and be centered therein when the tubular element has been detached.

SOLOMON WISE.

REFERENCES CITED

The following references are of record in the file of this patent:

UNITED STATES PATENTS

| Number | Name | Date |
| --- | --- | --- |
| 1,896,271 | Andrie | Feb. 7, 1933 |
| 1,923,336 | Stant | Aug. 22, 1933 |
| 2,038,003 | Ritz-Woller | Apr. 21, 1936 |
| 2,077,721 | Sinko | Apr. 20, 1937 |
| 2,078,211 | Williams | Apr. 20, 1937 |
| 2,202,055 | Juffa | May 28, 1940 |
| 2,391,498 | Wise | Dec. 25, 1945 |